J. T. BROOKS.
Endless Track Wheel.

No. 196,331.  Patented Oct. 23, 1877.

Witnesses.
G. J. Parker.
Chas. G. Day.

Inventor.
John T. Brooks.

UNITED STATES PATENT OFFICE.

JOHN T. BROOKS, OF ITHACA, NEW YORK.

IMPROVEMENT IN ENDLESS-TRACK WHEELS.

Specification forming part of Letters Patent No. 196,331, dated October 23, 1877; application filed September 23, 1876.

*To all whom it may concern:*

Be it known that I, JOHN T. BROOKS, of Ithaca, Tompkins county, New York, have invented an Improved Track-Wheel, of which the following is a specification, reference being had to the accompanying drawings.

My invention relates to a metallic circular rim having a surface for the ground, and an internal rail or track, on the rail or track portion of which moves, at its lower part, a main wheel; and the nature of my invention will be apparent as I describe it.

The uses of such wheels are for moving heavy cumbersome articles and materials, buildings, and like objects, to make vehicles for locomotion, as light or heavy trucks, carriages, and wagons drawn by horse or other power, and for slow or rapid motion, and which can be used for the purposes of these structures. When steam is directly connected with the running or lower inner wheel, there is made a draft engine or machine which is capable of plowing and other light work, and various other uses might be named.

Figure 1:
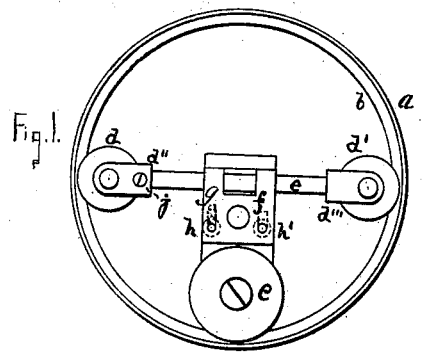
Figure 2:
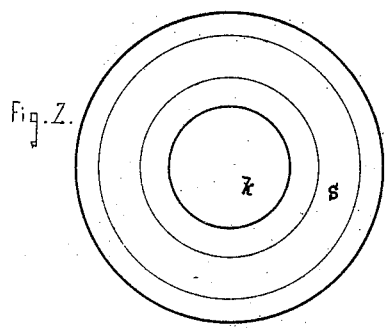
Figure 3:
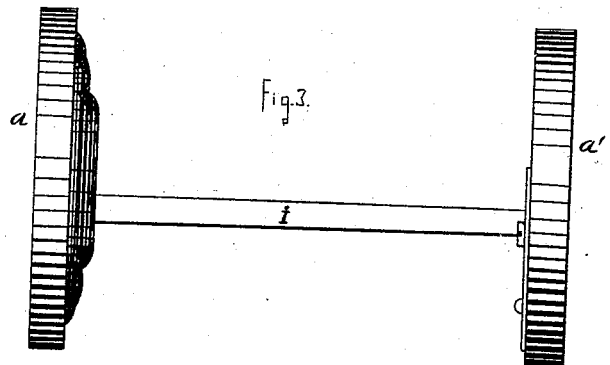
Figure 4:
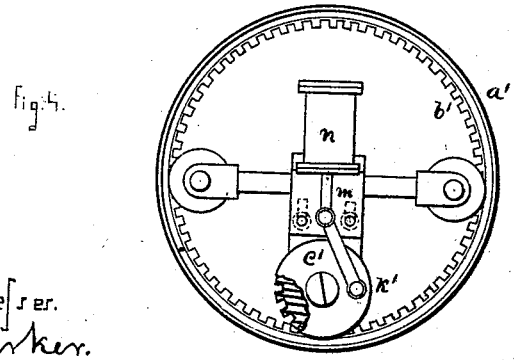

Figure 1 is a side elevation of a track-wheel. Fig. 2 is a track-wheel with capping to exclude dust and other substances or articles. Fig. 3 is a rear view of two wheels connected by an axle. Fig. 4 is an outside view of the track-wheel with steam-power combined with it.

In the figures, $a$ is the rim of the track-wheel, having on its inner surface the projection, rail, or track $b$, which is similar to the rail of a railroad-track, having running on it the burden or running wheel $c$. This wheel has two flanges, one on each side of the track or rail. By this wheel the rail and rim are constantly pushed forward, aided by the supporting-wheels $d$. Thus the rim is ever, as a railroad-rail, laid ever on the ground as it progresses, with the wheel $c$ as a car-wheel ever running on its inner surface or rail. Two wheels, $d\ d'$, with deep flanges to inclose each side of the rail of the rim, also run on the rail, and are connected with the running-wheel $c$ by a frame-work, as seen. They are for the purpose of holding the rim upright, in its proper relation for motion, and to be in constant proper relation to the main wheel $c$. These wheels $d\ d'$ are on the ends of a rod or shaft, $e$, and are made adjustable, one or both, on that shaft, so as to have some loose play on the rail of the rim. The shaft also has some play or motion upward and downward, which is aided by the loose play of the wheels $d\ d'$. The shaft $e$ is placed below the center of the vertical diameter of the rim. By this loose play of the wheels $d\ d'$ and this position of the shaft $e$, as it will be seen, the wheel $c$ is not confined to one relative spot on the rail, but is free to run up the incline of the rail, either forward or backward, and thus, when a stone or other obstacle is encountered, the passage over it is eased, for the wheel $c$ runs up the incline of the rail before the rim goes over the stone. This eases the elevation of the load on the track-wheel. In falling off of the top of the stone, the fall is eased if the rim falls before the wheel $c$ gets down, which it is enabled to do by these means. This is useful, especially when the track-wheel is moving slowly.

That I may further increase, both for slow and fast moving uses of the track-wheel, this variableness of the wheel $c$ backward and forward, I put a movable block, $f$, on the shaft $e$; and it is evident that this block can move either way from the central point between the wheels $d$ and $d'$, where it naturally would be, and that if a stone or other impediment be encountered the first action would be that the wheel $c$ would roll up the incline of the rail as the block $f$ moved forward on the shaft $e$, and the loose play of the wheels $d$ and $d'$, and the position of the shaft $e$ below the center of the track-wheel, would aid this forward movement of the block $f$ and wheel $c$. The same would follow with any motion slow enough to allow the rear movement of the block on the shaft, and the same movement would be had to the front or rear in case a hole, cavity, or ditch is encountered.

The wheel $c$ is connected with the block $f$ by an adjustable fixture, which, when fixed, has a changeless relation. The block $f$ is made of two parts, with screw-bolts $h\ h'$, the ends of the bolts only being shown. This adjustment is for the purpose of regulating the height of the shaft $e$, and, consequently, adjusting its degree of rise and fall.

In Fig. 2 the track-wheel is seen inclosed by a cover, and at its central part is an aperture, $k$. This is for the inside cap or cover, the axletree oscillating in it, for it is necessary that the aperture be as large as the oscillation is long. The outside cap is close, or with a part of the closed cap removable. The caps are corrugated, to stiffen and ornament them.

In Fig. 3, $a$ is the left-hand wheel, and $a'$ the right rim or wheel, with an axle, $i$, connecting them. For most purposes the axle is fixed immovably to the block $f$, and to the axle is secured other parts, as of wagons, trucks, and the like, necessary or useful for the purposes to which the track-wheel is applied. The track-wheel is represented as without a tire; but roughened tires, as well as other forms of tires to produce adhesion to the ground, are contemplated when steam is used to drive the track-wheel.

In Fig. 4 is seen the steam-cylinder $n$ and piston-rod $m$, crank, and the usual appliances of steam-power, made fast to the bolster-block $f$, and acting on the wheel $c$. To render the action of the steam more certain, the track or rail of the rim is cut into cogs, and cogs are cut in the wheels $c$. In that case the two flanges of the wheel $c$ are made wider, and bear on the rim, or on two track-rails on each side of the cog-rail, which bear the burden of the wheel; or, what is preferable, there are two rails made side by side, one for weight or burden and the other for the cogs.

Much might be said of the advantages and uses of my invention, but they are apparent to those skilled in the art to which they appertain.

I claim—

1. The rod or shaft $e$ and adjustable wheels $d$ $d'$ on its ends, the said rod and wheels being adapted to rise and fall as the wheel $c$ varies on the rail-surface, substantially as set forth.

2. The bolster and oscillating block $f$, moving backward and forward on the shaft $e$, and having fastened to it the wheel $c$ and the axle $i$, connecting the track-wheels, substantially as set forth.

3. The bolster and oscillating block $f$, when made adjustable in height, thereby regulating the position of the shaft $e$, as set forth.

4. The caps or covers $s$, in combination with and protecting the shaft $e$ and bolster-block $f$, and other internal parts, as shown and described.

5. The combined track-wheel, made of the parts described—namely, the adjustable bolster-block $f$, the shaft $e$, on which the bolster-block oscillates, wheels $d$ $d'$ $c$, and the rim or rail $b$, making the structure or device shown and set forth.

6. The steam-cylinder $n$ and piston $m$, by which steam-power acts on the burden-wheel $c$, in combination with, fast to and moving with, the bolster-block $f$, as set forth.

JOHN T. BROOKS.

Witnesses:
S. J. PARKER,
CHS. G. DAY.